United States Patent
Matsunaga et al.

(10) Patent No.: US 12,403,903 B2
(45) Date of Patent: Sep. 2, 2025

(54) MOBILE OBJECT CONTROL DEVICE AND MOBILE OBJECT CONTROL METHOD

(71) Applicant: HONDA MOTOR CO., LTD., Tokyo (JP)

(72) Inventors: Hideki Matsunaga, Wako (JP); Yuji Yasui, Wako (JP); Takashi Matsumoto, Wako (JP); Gakuyo Fujimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 491 days.

(21) Appl. No.: 17/701,728

(22) Filed: Mar. 23, 2022

(65) Prior Publication Data

US 2022/0314987 A1 Oct. 6, 2022

(30) Foreign Application Priority Data

Mar. 30, 2021 (JP) .................................. 2021-056994

(51) Int. Cl.
*B60W 30/14* (2006.01)
*B60Q 9/00* (2006.01)
(Continued)

(52) U.S. Cl.
CPC ............. *B60W 30/146* (2013.01); *B60Q 9/00* (2013.01); *B60W 30/182* (2013.01);
(Continued)

(58) Field of Classification Search
CPC .. B60W 30/146; B60W 30/182; B60W 40/06; B60W 40/114; B60W 50/14;
(Continued)

(56) References Cited

U.S. PATENT DOCUMENTS 10,915,762 B1  2/2021  Russell
11,897,464 B2*  2/2024  Yasui ..................... B60W 10/04
(Continued)

FOREIGN PATENT DOCUMENTS

CN    111746515    10/2020
EP      2045178     4/2009
(Continued)

OTHER PUBLICATIONS

Japanese Office Action for Japanese Patent Application No. 2021-056994 dated May 21, 2024.
(Continued)

*Primary Examiner* — Thomas E Worden
*Assistant Examiner* — Madison B Emmett
(74) *Attorney, Agent, or Firm* — Amin, Turocy & Watson, LLP

(57) ABSTRACT

A hardware processor of a mobile object executes a program stored in a storage device to acquire information indicating a behavior of a mobile object; to recognize whether the mobile object is moving on a roadway or a predetermined region; to recognize presence of a contact portion between the predetermined region and the roadway; to limit a speed at which the mobile object is moving on the roadway to a first speed; to limit a speed at which the mobile object is moving on the predetermined region to a second speed slower than the first speed; and to bring a speed of the mobile object closer to the second speed when the mobile object is moving on the roadway, the contact portion is recognized within a predetermined range from the mobile object, and a behavior of the mobile object satisfies a predetermined condition.

12 Claims, 8 Drawing Sheets

(51) Int. Cl.
  *B60W 30/182* (2020.01)
  *B60W 40/06* (2012.01)
  *B60W 40/114* (2012.01)
  *B60W 50/14* (2020.01)
  *B60W 60/00* (2020.01)
  *G06V 20/56* (2022.01)

(52) U.S. Cl.
  CPC .......... *B60W 40/06* (2013.01); *B60W 40/114* (2013.01); *B60W 50/14* (2013.01); *B60W 60/00253* (2020.02); *G06V 20/588* (2022.01); *B60W 2050/143* (2013.01); *B60W 2420/403* (2013.01); *B60W 2520/14* (2013.01); *B60W 2552/45* (2020.02)

(58) Field of Classification Search
  CPC ..... B60W 60/00253; B60W 2050/143; B60W 2420/403; B60W 2520/14; B60W 2552/45; B60W 2552/53; B60W 2554/60; B60W 2720/10; B60W 60/005; B60W 30/09; B60W 60/001; B60Q 9/00; B60Q 1/5035; B60Q 1/545; G06V 20/588; G06V 20/59
  See application file for complete search history.

(56) References Cited

U.S. PATENT DOCUMENTS

2019/0310091 A1  10/2019  Maeda et al.
2019/0383627 A1* 12/2019  Nangeroni ........ B60W 50/0098
2020/0307632 A1  10/2020  Tsuji et al.
2021/0034156 A1   2/2021  Drayna
2021/0165404 A1*  6/2021  Gillett ................ G01C 21/3691
2022/0314987 A1  10/2022  Matsunaga et al.
2023/0062186 A1*  3/2023  Measel .................. G06V 20/10

FOREIGN PATENT DOCUMENTS

| | | |
|---|---|---|
| JP | 2009-089758 | 4/2009 |
| JP | 2016-212120 | 12/2016 |
| JP | 2017-100490 | 6/2017 |
| JP | 2019/056952 | 4/2019 |
| JP | 2020-027459 | 2/2020 |
| JP | 2020-121573 | 8/2020 |
| JP | 2020-185889 | 11/2020 |
| JP | 2020-189536 | 11/2020 |
| JP | 2021-046031 | 3/2021 |
| JP | 2022-154110 | 10/2022 |
| WO | 2018/134863 | 7/2018 |
| WO | 2019/181709 | 9/2019 |

OTHER PUBLICATIONS

Chinese Office Action for Chinese Patent Application No. 202210154478.4 mailed Apr. 30, 2025.

Japanese Office Action for Japanese Patent Application No. 2024-181793 mailed Jun. 24, 2025.

* cited by examiner

MOBILE OBJECT CONTROL DEVICE AND MOBILE OBJECT CONTROL METHOD

CROSS-REFERENCE TO RELATED APPLICATION

Priority is claimed on Japanese Patent Application No. 2021-056994, filed Mar. 30, 2021, the content of which is incorporated herein by reference.

BACKGROUND

Field of the Invention

The present invention relates to a mobile object control device and a mobile object control method.

Description of Related Art

In the related art, the invention of a one-person riding electromotive vehicle capable of moving on a sidewalk has been disclosed (see Japanese Unexamined Patent Application, First Publication No. 2020-189536).

SUMMARY

Technologies of the related art have not taken into account mobile objects capable of moving on both roadways and predetermined regions different from roadways. Therefore, appropriate control cannot be performed at the time of entrance to predetermined regions from roadways in some cases.

The present invention is devised in view of such circumstances and an objective of the present invention is to provide a mobile object control device and a mobile object control method capable of appropriately controlling a mobile object capable of moving on both a roadway and a predetermined region different from the roadway at the time of entrance to a predetermined region from a roadway.

A driving support device, a mobile object control device and a mobile object control method according to the present invention adopt the following configurations.

(1) According to an aspect of the present invention, a mobile object control device includes a storage device storing a program and a hardware processor. The hardware processor executes the program stored in the storage device to: acquire information indicating a behavior of a mobile object which is capable of moving on both a roadway and a predetermined region different from the roadway; recognize whether the mobile object is moving on the roadway or the predetermined region; recognize presence of a contact portion between the predetermined region and the roadway in a traveling direction of the mobile object; control the speed of the mobile object at least partially; to limit a speed at which the mobile object is moving on the roadway to a first speed; limit a speed at which the mobile object is moving on the predetermined region to a second speed slower than the first speed; and bring a speed of the mobile object closer to the second speed when the mobile object is moving on the roadway, the contact portion is recognized within a predetermined range from the mobile object, and a behavior of the mobile object satisfies a predetermined condition.

(2) In the mobile object control device according to the aspect (1), the predetermined condition may be a condition for determining whether the mobile object is in an unsteady state.

(3) In the mobile object control device according to the aspect (1), the hardware processor may question about an intention to enter the predetermined region using an interface device when the mobile object is moving on the roadway, the contact portion is recognized within a predetermined range from the mobile object, and the behavior of the mobile object may satisfy the predetermined condition, and a speed of the mobile object may be brought closer to the second speed when a positive response is obtained.

(4) In the mobile object control device according to the aspect (1), the hardware processor may acquire a movement amount, a speed, or an acceleration of the mobile object in a road width direction as information indicating a behavior of the mobile object. The predetermined condition may include a condition that the number of times the movement amount, the speed, or a direction of the acceleration in the road width direction is reversed for a predetermined period is equal to or greater than a first threshold.

(5) In the mobile object control device according to the aspect (1), the hardware processor may acquire a position of the mobile object in the road width direction as information indicating a behavior of the mobile object. The predetermined condition may include a condition that a time or distance ratio of movement in a reference region approximate to the predetermined region on the roadway for a predetermined period is equal to or greater than a second threshold.

(6) In the mobile object control device according to the aspect (1), the hardware processor may acquire an acceleration of the mobile object in a road length direction as information indicating a behavior of the mobile object. The predetermined condition may include a condition that the number of times the acceleration in the road length direction is reversed for a predetermined period is equal to or greater than a third threshold.

(7) In the mobile object control device according to the aspect (1), the hardware processor may acquire a yaw rate of the mobile object as information indicating a behavior of the mobile object. The predetermined condition may include a condition that the number of times the yaw rate equal to or greater than a reference value occurs for a predetermined period is equal to or greater than a fourth threshold.

(8) In the mobile object control device according to the aspect (1), the hardware processor may recognize whether the mobile object is moving on the roadway or the predetermined region based on an output of an outside world detection device detecting an outside situation of the mobile object.

(9) In the mobile object control device according to the aspect (1), the hardware processor may recognize whether the mobile object is moving on the roadway or the predetermined region based on a manipulation of an occupant of the mobile object on a switch provided inside the mobile object.

(10) In the mobile object control device according to the aspect (1), when the hardware processor recognizes that the mobile object is moving on the predetermined region, the hardware processor may cause an external report device to report the mobile object which is moving on the predetermined region to the outside of the mobile object.

(11) According to another aspect of the present invention, a mobile object control method is performed by a computer controlling a mobile object which is capable of moving both on a roadway and a predetermined region different from the roadway to: acquire information indicating a behavior of the mobile object. The method includes: recognizing whether the mobile object is moving on the roadway or the predetermined region; recognizing presence of a contact portion between the predetermined region and the roadway in a traveling direction of the mobile object; controlling the speed of the mobile object at least partially; limiting a speed at which the mobile object is moving on the roadway to a first speed; limiting a speed at which the mobile object is moving on the predetermined region to a second speed slower than the first speed; and bringing a speed of the mobile object closer to the second speed when the mobile object is moving on the roadway, the contact portion is recognized within a predetermined range from the mobile object, and a behavior of the mobile object satisfies a predetermined condition.

(12) According to still another aspect of the present invention, a mobile object control device includes a storage device storing a program and a hardware processor. The hardware processor executes the program stored in the storage device to: acquire information indicating a behavior of a mobile object on which at least one occupant gets and which is capable of moving on both a roadway and a predetermined region different from the roadway; recognize whether the mobile object is moving on the roadway or the predetermined region; recognize presence of a contact portion between the predetermined region and the roadway in a traveling direction of the mobile object; control the speed of the mobile object at least partially; limit a speed at which the mobile object is moving on the roadway to a first speed; limit a speed at which the mobile object is moving on the predetermined region to a second speed slower than the first speed; and suggest deceleration to the occupant using an interface device when the mobile object is moving on the roadway, the contact portion is recognized within a predetermined range from the mobile object, and the behavior of the mobile object satisfies a predetermined state.

(13) According to still another aspect of the present invention, a mobile object control method is performed by a computer controlling a mobile object on which at least one occupant gets and which is capable of moving both on a roadway and a predetermined region different from the roadway. The method includes: acquiring information indicating a behavior of a mobile object; recognizing whether the mobile object is moving on the roadway or the predetermined region; recognizing presence of a contact portion between the predetermined region and the roadway in a traveling direction of the mobile object; controlling the speed of the mobile object at least partially; limiting a speed at which the mobile object is moving on the roadway to a first speed; limiting a speed at which the mobile object is moving on the predetermined region to a second speed slower than the first speed; and suggesting deceleration to the occupant using an interface device when the mobile object is moving on the roadway, the contact portion is recognized within a predetermined range from the mobile object, and the behavior of the mobile object satisfies a predetermined state.

According to the aspects (1) to (13), it is possible to appropriately control a mobile object capable of moving on both a roadway and a predetermined region different from the roadway at the time of entrance to a predetermined region from a roadway.

DETAILED DESCRIPTION

Hereinafter, an embodiment of a mobile object control device and a mobile object control method according to the present invention will be described with reference to the drawings. A mobile object moves on both a roadway and a predetermined region different from the roadway. The predetermined region is, for example, a sidewalk. The predetermined region may be some or all of a roadside strip, a bicycle lane, a public open space, and the like or may include all of a sidewalk, a roadside strip, a bicycle lane, and a public open space. In the following description, the predetermined region is assumed to be a sidewalk. In the following description, a portion described as a "sidewalk" can be appropriately replaced with the "predetermined region."

First Embodiment

Figure 1:
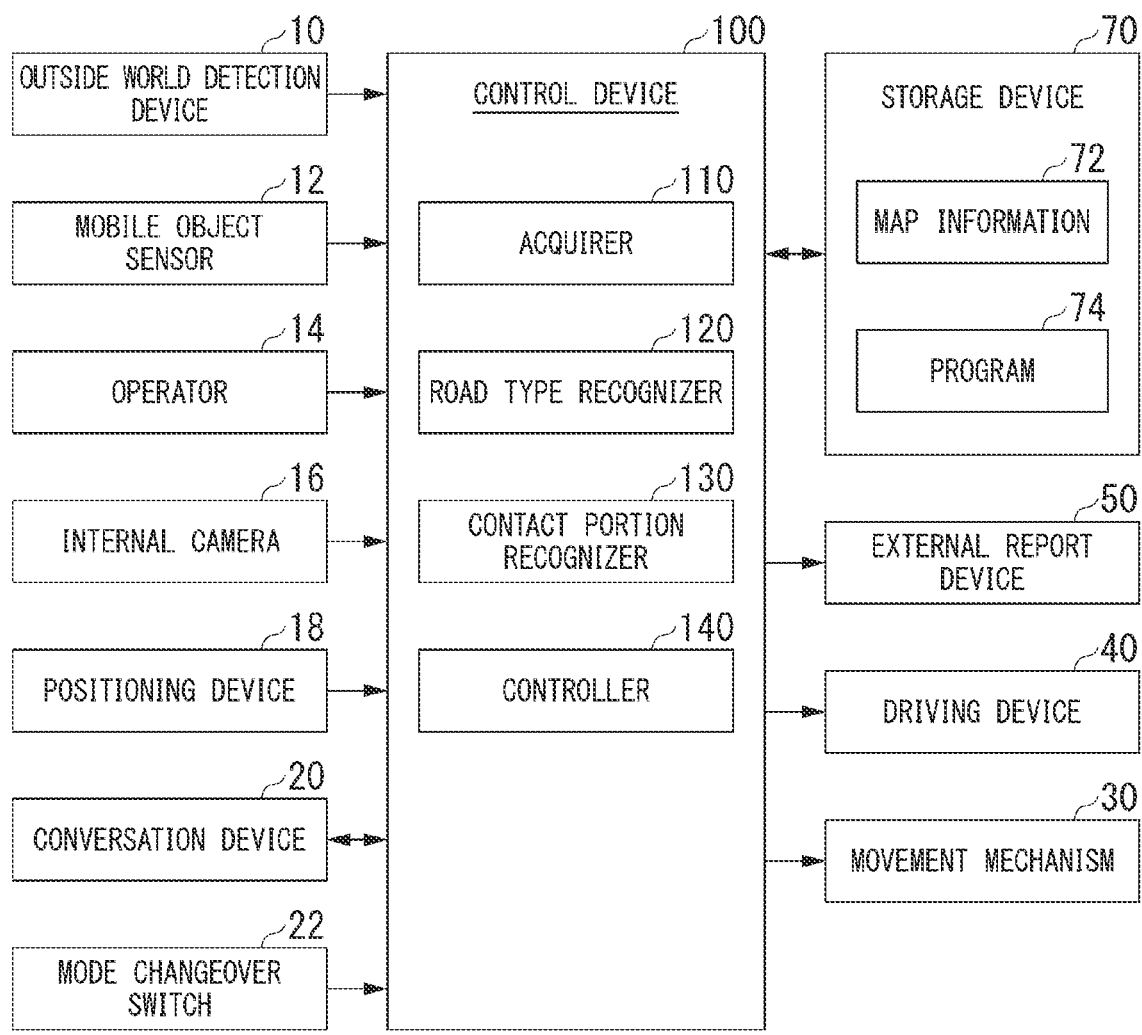
FIG. 1 is a diagram illustrating an exemplary configuration of a mobile object and a control device according to an embodiment.

FIG. 1 is a diagram illustrating an exemplary configuration of a mobile object 1 and a control device 100 according to an embodiment. In the mobile object 1, for example, an outside world detection device 10, a mobile object sensor 12, an operator 14, an internal camera 16, a positioning device 18, a conversation device 20, a mode changeover switch 22, a movement mechanism 30, a driving device 40, an external report device 50, a storage device 70, and a control device 100 are mounted. Of these constituents, some of the constituents unnecessary to implement functions of the present invention may be omitted.

The outside world detection device 10 is any of various devices in which a traveling direction of the mobile object 1 is a detection range. The outside world detection device 10 includes an external camera, a radar device, a light detection and ranging (LIDAR) device, and a sensor fusion device. The outside world detection device 10 outputs information (an image, a position of an object, or the like) indicating a detection result to the control device 100.

The mobile object sensor 12 includes, for example, a speed sensor, an acceleration sensor, a yaw rate (angular velocity) sensor, an azimuth sensor, and a manipulation amount detection sensor or the like mounted on the operator 14. The operator 14 includes, for example, an operator (for example, an accelerator pedal or a brake pedal) for giving an instruction for an acceleration or deceleration speed and an operator (for example, a steering wheel,) for giving an instruction for steering. In this case, the mobile object sensor 12 may include an accelerator opening sensor, a brake step sensor, and a steering torque sensor. The mobile object 1 may include an operator (for example, a rotational operator with no annular shape, a joystick, a button, or the like) other than the above sensor as the operator 14.

The internal camera 16 images at least the head of an occupant of the mobile object 1 in front. The internal camera 16 is a digital camera using an image sensor such as a charge coupled device (CCD) camera or a complementary metal oxide semiconductor (CMOS) camera. The internal camera 16 outputs captured images to the control device 100.

The positioning device 18 is a device that locates a position of the mobile object 1. The positioning device 18 is, for example, global navigation satellite system (GNSS) receiver, identifies a position of the mobile object 1 based on signals received from GNSS satellites, and outputs the position as positional information. The positional information of the mobile object 1 may be estimated from a position of a Wi-Fi base station to which a communication device to be described below is connected.

The conversation device 20 includes, for example, a speaker, a microphone, a touch panel, and a communication device. The conversation device 20 appropriately processes a vocal sound of an occupant corrected by a microphone, transmits the processed vocal sound to a server device using a communication device via a network, and supplies information regarding the vocal sound from a speaker based on information replied from the server device. The conversation device 20 is also called an agent device, a concierge device, an assistance device, or the like in some cases. The server device has a sound recognition function, a natural language processing function, a meaning interpretation function, a reply content determination function, and the like. The conversation device 20 may transmit the positional information to the server device and the server device may reply with the positional information and information of facility corresponding to a guidance request (for example, "Where is a delicious noodle shop nearby?") coming from an occupant. In this case, a sound guidance such as "If you turn left ahead, it is there" is performed by the conversation device 20. The present invention is not limited thereto. The conversation device 20 has a function of receiving a natural speech from an occupant and returning an appropriate reply. The conversation device 20 may have a function of performing a simple conversation without involvement with the server device, such as a function of asking a question from a device side and receiving a reply, and thus may question an occupant in response to a request from the control device 100. The conversation device 20 is an example of an interface device.

The mode changeover switch 22 is a switch manipulated by an occupant. The mode changeover switch 22 may be a mechanical switch or may be a graphical user interface (GUI) switch set on a touch panel. The mode changeover switch 22 receives a manipulation of switching a driving mode to any one of, for example, mode A which is a speed assistance mode in which a steering manipulation is performed by an occupant and acceleration or deceleration speed control is automatically performed: mode B which is a manual driving mode in which a steering manipulation and an acceleration or deceleration speed manipulation are performed by an occupant, and mode C which is an automated driving mode in which manipulation control and acceleration or deceleration speed control are automatically performed.

The movement mechanism 30 is a mechanism that moves the mobile object 1 on a road. The movement mechanism 30 is, for example, a wheel group including a steering wheel and driving wheel. The movement mechanism 30 may be each section for multiped walking.

The driving device 40 outputs a force to the movement mechanism 30 to move the mobile object 1. For example, the driving device 40 includes a motor driving the driving wheel, a battery storing power to be supplied to the motor, and a steering device that adjust a steering angle of the steering wheel. The driving device 40 may include an internal combustion engine or a fuel cell as a driving power output unit or a power generation unit. The driving device 40 may further include a brake device operating with a frictional force or air resistance.

The external report device 50 is provided in an external plate unit of the mobile object 1 and is, for example, a lamp, a display device, a speaker, or the like for reporting information to the outside of the mobile object 1. The external report device 50 performs different operations between a state in which the mobile object 1 is moving on a sidewalk and a state in which the mobile object 1 is moving on a roadway. For example, the external report device 50 performs control such that a lamp is caused to emit light when the mobile object 1 is moving on a sidewalk, and the lamp is caused not to emit light when the mobile object 1 is moving on a roadway. The color of the light emitted from the lamp may be appropriate color determined by laws. When the external report device 50 is a display device, the external report device 50 displays an indication of "traveling on a sidewalk" in text or a graph in a case in which the mobile object 1 is traveling on a sidewalk.

Figure 2:
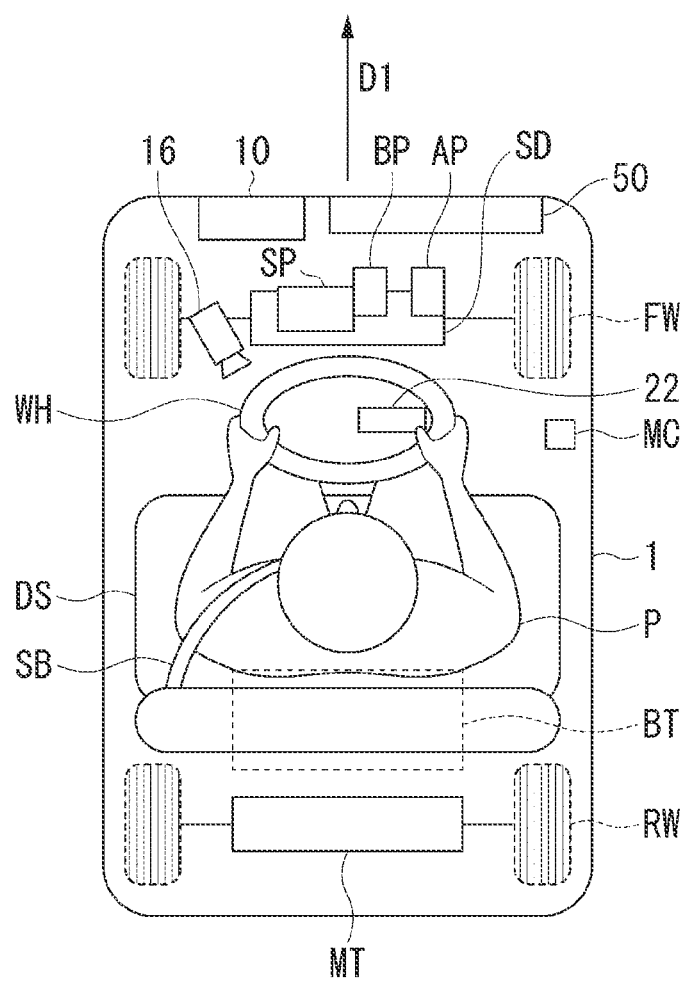
FIG. 2 is a perspective view illustrating the mobile object when viewed from the upper side.

FIG. 2 is a perspective view illustrating the mobile object 1 when viewed from the upper side. In the drawing, FW denotes a steering wheel, RW denotes a driving wheel, SD is a steering device, MT denotes a motor, and BT denotes a battery. AP denotes an accelerator pedal, BP denotes a brake pedal, WH denotes a steering wheel, SP denotes a speaker, and MC denotes a microphone. The illustrated mobile object 1 is a one-person riding mobile object and an occupant P sits on a driving seat DS and a seat belt SB is fastened. An arrow D1 indicates a traveling direction (a velocity vector) of the mobile object 1. The outside world detection device 10 is provided near a front edge of the mobile object 1, the internal camera 16 is provided at a position at which the head of the occupant P can be imaged from the front of the occupant P, and the mode changeover switch 22 is provided in each of a boss section of the steering wheel WH. The external report device 50 is provided as a display device near a front edge of the mobile object 1.

Referring back to FIG. 1, the storage device 70 is, for example, a non-transitory storage device such as a hard disk drive (HDD), a flash memory, or a random access memory (RAM). The storage device 70 stores map information 72, a program 74 which is executed by the control device 100, and the like. In the drawing, the storage device 70 is illustrated outside of a range of the control device 100, but the storage device 70 may be included in the control device 100.

Control Device

The control device 100 includes, for example, an acquirer 110, a road type recognizer 120, a contact portion recognizer 130, and a controller 140. For example, a hardware processor such as a central processing unit (CPU) executes the program (software) 74 for implementation. Some or all of the constituent elements may be implemented by hardware (a circuit unit including circuitry) such as a large scale integration (LSI), an application specific integrated circuit (ASIC), a field-programmable gate array (FPGA), or a graphics processing unit (GPU) or may be implemented by software and hardware in cooperation. The program may be stored in advance in the storage device 70 or may be stored in a detachably mounted storage medium such as a DVD or a CD-ROM so that the storage medium (a non-transitory storage medium) is mounted on a drive device to be installed on the storage device 70.

Figure 3:
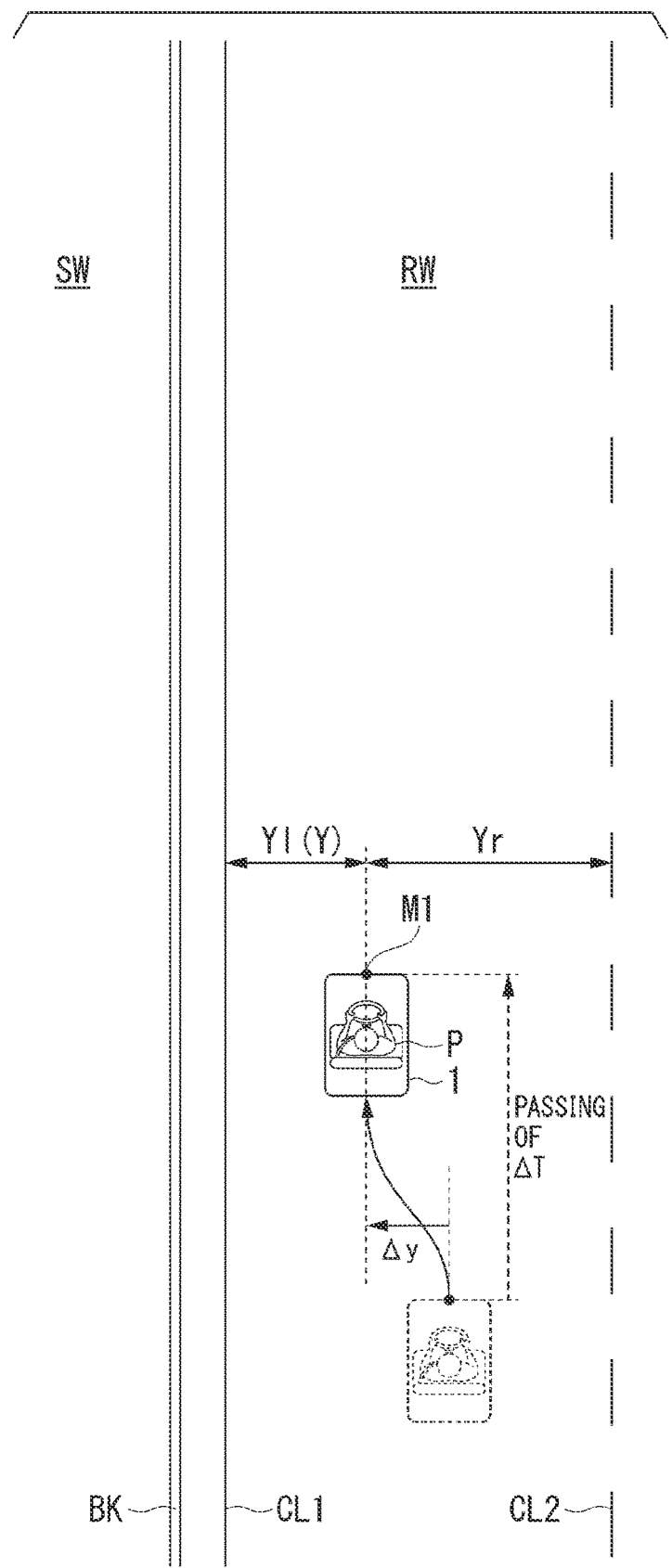
FIG. 3 is a diagram illustrating elements included in a behavior of the mobile object.

The acquirer 110 acquires information indicating a behavior of the mobile object 1. The information indicating a behavior of the mobile object 1 is, for example, a position of the mobile object 1 in a road width direction, a movement amount, a speed, an acceleration, acceleration in a longitudinal direction of a road, a yaw rate, or the like. FIG. 3 is a diagram illustrating elements included in a behavior of the mobile object 1. A position Y of the mobile object 1 in a road width direction is indicated by, for example, a distance between any of the left and right ends of a road and a representative point (for example, a front edge center or a center of gravity) M1 of the mobile object 1. In the drawing, Yl is a distance between the left end of the road (a white line CL1 indicating the left end of the roadway RW in the drawing) and the representative point M1 of the mobile object 1 and Yr is a distance between the right end of the road (a dashed line CL2 demarcating a lane in which there is the mobile object 1 and an opposing lane in the drawing) and the representative point M1 of the mobile object 1. In the following description, the distance Yl between the left end of the road and the representative point M1 of the mobile object 1 is assumed to be acquired as the position Y of the mobile object 1 in the road width direction. The present invention is not limited to a position of a road demarcating line recognized as the left or right end of the road. A road shoulder, a guardrail, a median strip, or the like may be recognized as the left or right end of a road.

The acquirer 110 acquires, for example, a distance from the representative point M1 of the mobile object 1 to the road demarcating line CL1 input from the outside world detection device 10 as a position of the mobile object 1 in the road width direction. A movement amount $\Delta Y$ of the mobile object 1 in the road width direction is information indicating how much the mobile object has moved in any orientation of the road width direction for an observation period $\Delta t$ (which is different from a reference period $\Delta T$ to be described below and is, for example, a value shorter than the reference period $\Delta T$). The acquirer 110 may obtain the movement amount $\Delta Y$ of the mobile object 1 in the road width direction based on a change in the observation period of the position Y of the mobile object 1 in the road width direction or may obtain a movement amount of the mobile object 1 in the road width direction by integrating a speed VY of the mobile object 1 in the road width direction. The acquirer 110 acquires a speed, an acceleration, or a yaw rate in each direction based on detected values of the mobile object sensor 12.

The road type recognizer 120 recognizes whether the mobile object 1 is moving on a roadway or a sidewalk. The road type recognizer 120 recognizes whether the mobile object 1 is moving on a roadway or a sidewalk, for example, by analyzing an image captured by an external camera of the outside world detection device 10. An example of image analysis includes semantic segmentation. The road type recognizer 120 classifies pixels of a frame of an image into classes (roadways, sidewalks, boundaries, obstacles, and the like) and performs labeling, recognizes that the mobile object 1 is moving on a roadway when the number of pixels labeled as a roadway in a region equivalent to a front face of the mobile object 1 is large, and recognizes that the mobile object 1 is moving on a sidewalk when the number of pixels in which a label of the sidewalk is granted to a region equivalent to the front face of the mobile object 1 is large in the image. The present invention is not limited thereto. When the road type recognizer 120 recognizes a vehicle in a region equivalent to the front face of the mobile object 1 in the image, the road type recognizer 120 may recognize that the mobile object 1 is moving in the roadway. When the road type recognizer 120 recognizes a pedestrian in a region equivalent to the front face of the mobile object 1 in the image, the road type recognizer 120 may recognize that the mobile object 1 is moving on the sidewalk. When the width of a road surface region which is in the region equivalent to the front face of the mobile object 1 in the image is large, the road type recognizer 120 may recognize that the mobile object 1 is moving on the roadway. When the width of the road surface region which is in the region equivalent to the front face of the mobile object 1 in the image is small, the road type recognizer 120 may recognize that the mobile object 1 is moving on the sidewalk. The road type recognizer 120 may combine positional information of the mobile object 1 and the map information 72 and recognize whether the mobile object 1 is moving on a roadway or a sidewalk. In this case, it is necessary for the map information to have accuracy to the degree that the roadway and the sidewalk can be distinguished from each other from positional coordinates. When there is no "predetermined region" in a sidewalk, the road type recognizer 120 performs a similar process on a roadside strip, a bicycle lane, a public open space, or the like.

Figure 4:
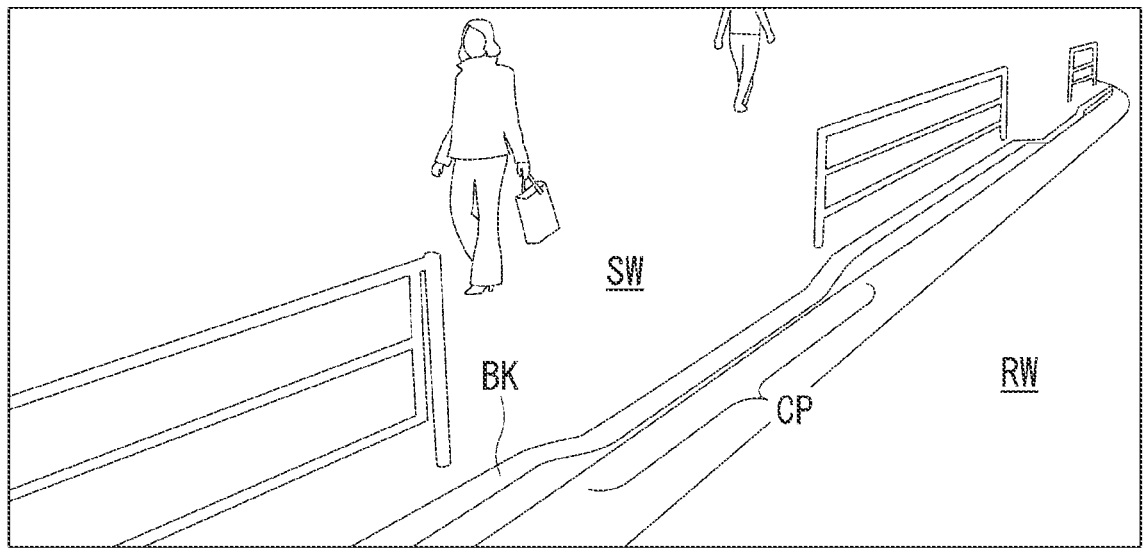
FIG. 4 is a diagram illustrating an exemplary shape of the contact portion.
Figure 5:
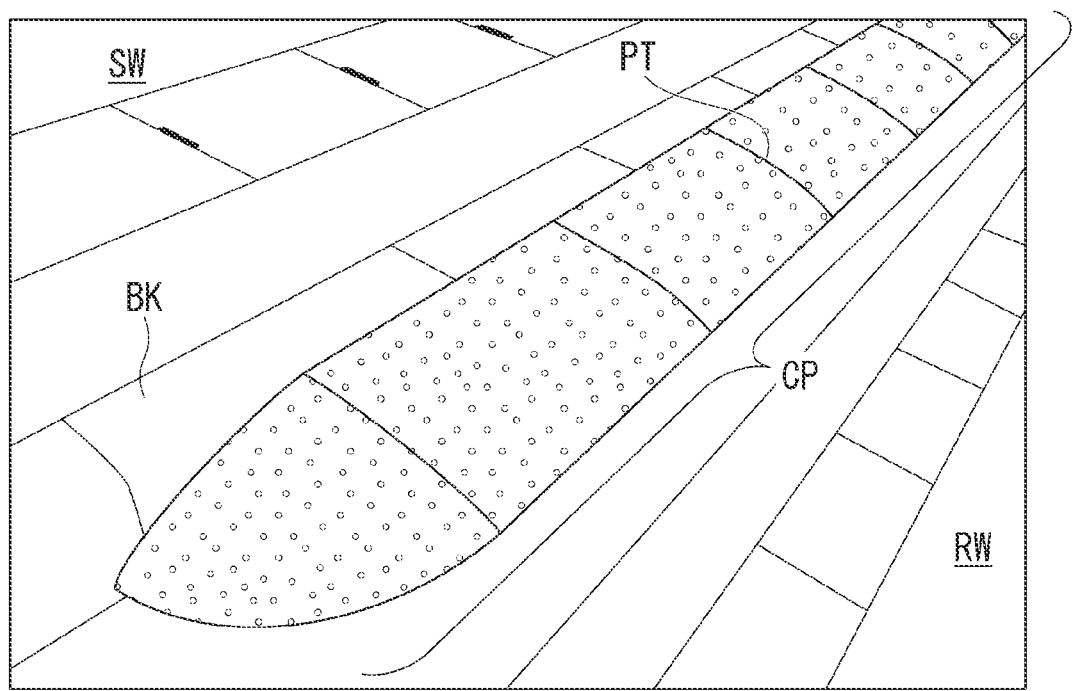
FIG. 5 is a diagram illustrating an exemplary shape of the contact portion.
Figure 6:
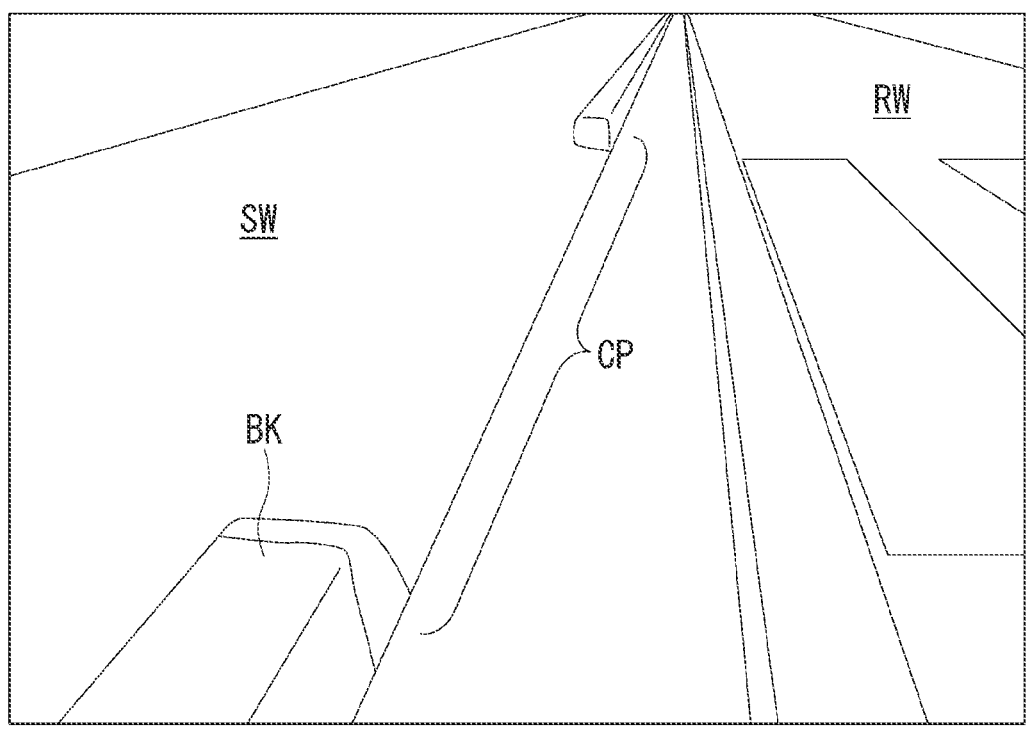
FIG. 6 is a diagram illustrating an exemplary shape of the contact portion.

The contact portion recognizer 130 recognizes presence of a contact portion between a sidewalk and a roadway in a traveling direction of the mobile object. The contact portion is provided at a boundary between a sidewalk and a roadway and is a portion in which a load is less than in other portions of the boundary when the mobile object passes through. For example, when there is a step difference in the boundary between the sidewalk and the roadway, a portion (including a portion in which the sidewalk is flush with the roadway) in which the step difference is alleviated. FIGS. 4 to 6 are diagrams illustrating an exemplary shape of a contact portion. As illustrated in FIG. 4, the contact portion CP is, for example, a portion in which a block BK of the boundary is lowered together with a sidewalk SW. In the drawing, RW denotes a roadway. As illustrated in FIG. 5, the contact portion CP may be a portion in which a step difference canceling plate PT with which the step difference between the roadway RW and the sidewalk SW is buried is placed. As illustrated in FIG. 6, the contact portion CP may be a portion in which the block BK where there is a step difference between the roadway RW and the sidewalk SW is missing. Apart from these exemplified shapes, the contact portion CP with any of various shapes is assumed. The contact portion CP may be present not only in a portion along the way of a road but also in an intersection or the like. For example, when an image is input, the contact portion recognizer 130 recognizes presence of the contact portion CP by inputting an image captured by an external camera to a learned model that is learned so that information indicating a position of the contact portion CP is output. The contact portion recognizer 130 may recognize presence of the contact portion CP based on the shape of a step difference obtained as a result by performing scanning obliquely downward with an LIDAR.

For example, the controller 140 controls the driving device 40 in accordance with a set driving mode.

In mode A, the controller 140 controls the driving device 40 such that a distance from an object in front of the mobile object 1 is kept to be a constant value or more when the mobile object 1 is moving on a roadway, and the mobile object 1 is moving at a first speed V1 (for example, a speed equal to or greater than 10 [km/h] and less than tens of [km/h]) when the distance from the object in front of the mobile object 1 is sufficiently long. The controller 140 controls the driving device 40 such that the distance from the object in front of the mobile object 1 is kept to be a constant value or more when the mobile object 1 is moving on a sidewalk, and the mobile object 1 is moving at a second speed V2 (for example, a speed less than 10 [km/h]) when the distant to the object in front of the mobile object 1 is sufficiently long. This function is similar to an adaptive cruise control (ACC) function of a vehicle moving at a speed set as the first speed V1 or the second speed V2 and a technology used for ACC can be used. In mode A, the controller 140 controls a steering angle of a steering wheel based on a manipulation amount of the operator 14 such as a steering wheel. This function is a similar to a function of a power steering device and a technology used for a power steering device can be used. Without performing electronic control on steering, the mobile object 1 may include a steering device to which the operator 14 and the steering mechanism are mechanically connected.

In mode B, the controller 140 controls the driving device 40 based on a speed of the mobile object 1 and a manipulation amount of an accelerator pedal or a brake pedal. The controller 140 controls the driving device 40 such that the first speed V1 is set an upper limit of the speed when the mobile object 1 is moving on a roadway (in the case of mode B, a case in which the speed reaches an upper limit of the speed means that the mobile object 1 cannot be accelerated even if an instruction for further acceleration is given). The controller 140 controls the driving device 40 such that the second speed V2 is set as the upper limit of the speed when the mobile object 1 is moving on a sidewalk. Steering is similar to that of mode A.

In mode C, the controller 140 controls the driving device 40 such that a course and obstacles are detected based on an output of the outside world detection device 10, a target trajectory along which the mobile object 1 can move while avoiding obstacles in the course is generated, and the mobile object 1 moves along the target trajectory. Even in mode C, the controller 140 controls the driving device 40 such that the first speed V1 is set as the upper limit of the speed when the mobile object 1 is moving on a roadway. The controller 140 controls the driving device 40 such that the second speed V2 is set as the upper limit of the speed when the mobile object 1 is moving on a sidewalk. Since mode C is not a core of the present invention, more detailed description will be omitted.

Control in Accordance with Presence of Contact Portion

Hereinafter, control in accordance with presence of a contact portion by the controller 140 will be described in order from mode A. In mode A, the controller 140 brings a speed of the mobile object 1 closer to the second speed V2 from the first speed V1 when the mobile object 1 is moving on a roadway, a contact portion is recognized within a predetermined range from the mobile object 1, and a behavior of the mobile object 1 satisfies a predetermined condition. "Bringing of the speed of the mobile object 1 closer to the second speed V2 from the first speed V1" means deceleration of the mobile object 1 except for a case in which the mobile object 1 is moving at a low speed or stops in accordance with presence of an unexpected obstacle. At this time, the controller 140 may ask a question about an intention of the occupant to enter a sidewalk using the conversation device 20, may bring the speed of the mobile object 1 closer to the second speed V2 when a positive reply is obtained, and may not bring the speed of the mobile object 1 closer to the second speed V2 when a positive reply is not obtained. Hereinafter, irrespective of whether there is a question, "bringing of the speed of the mobile object 1 closer to the second speed V2 from the first speed V1 when the mobile object 1 is moving on a roadway, a contact portion is recognized within a predetermined range from the mobile object 1, and a state of an occupant is a predetermined state" is referred to as "specific speed control."

The predetermined condition is a condition for determining whether the mobile object 1 is in an unsteady state. The predetermined condition include some or all of the following enumerated conditions under an AND condition or an OR condition. That is, the controller 140 determines that the predetermined condition is satisfied when one of the following conditions (A) to (D) is satisfied or when a plurality of conditions are satisfied simultaneously.

Condition (A)

The predetermined condition includes, for example, a condition that the number of times a movement amount $\Delta Y$, a speed VY, or a direction of an acceleration $\alpha Y$ in a road width direction is reversed for a reference period $\Delta T$ is equal to or greater than a first threshold Th1. The "reversing" is reversing an orientation. In the determination of the predetermined condition, the number of times the movement amount $\Delta Y$, the speed VY, or an acceleration $\alpha Y$ is reversed small near zero may not be counted as an error factor. When this condition is satisfied, a reverse lateral movement in an orientation occurs several times in a short time. Therefore, a traffic situation of a roadway is congested and smooth movement may be difficult. Alternatively, since the occupant P may be fatigue, accuracy of a steering manipulation is estimated to deteriorate. Therefore, it is considered that the occupant P is highly likely to feel an intention to enter a sidewalk and continuously move.

Condition (B)

Figure 7:
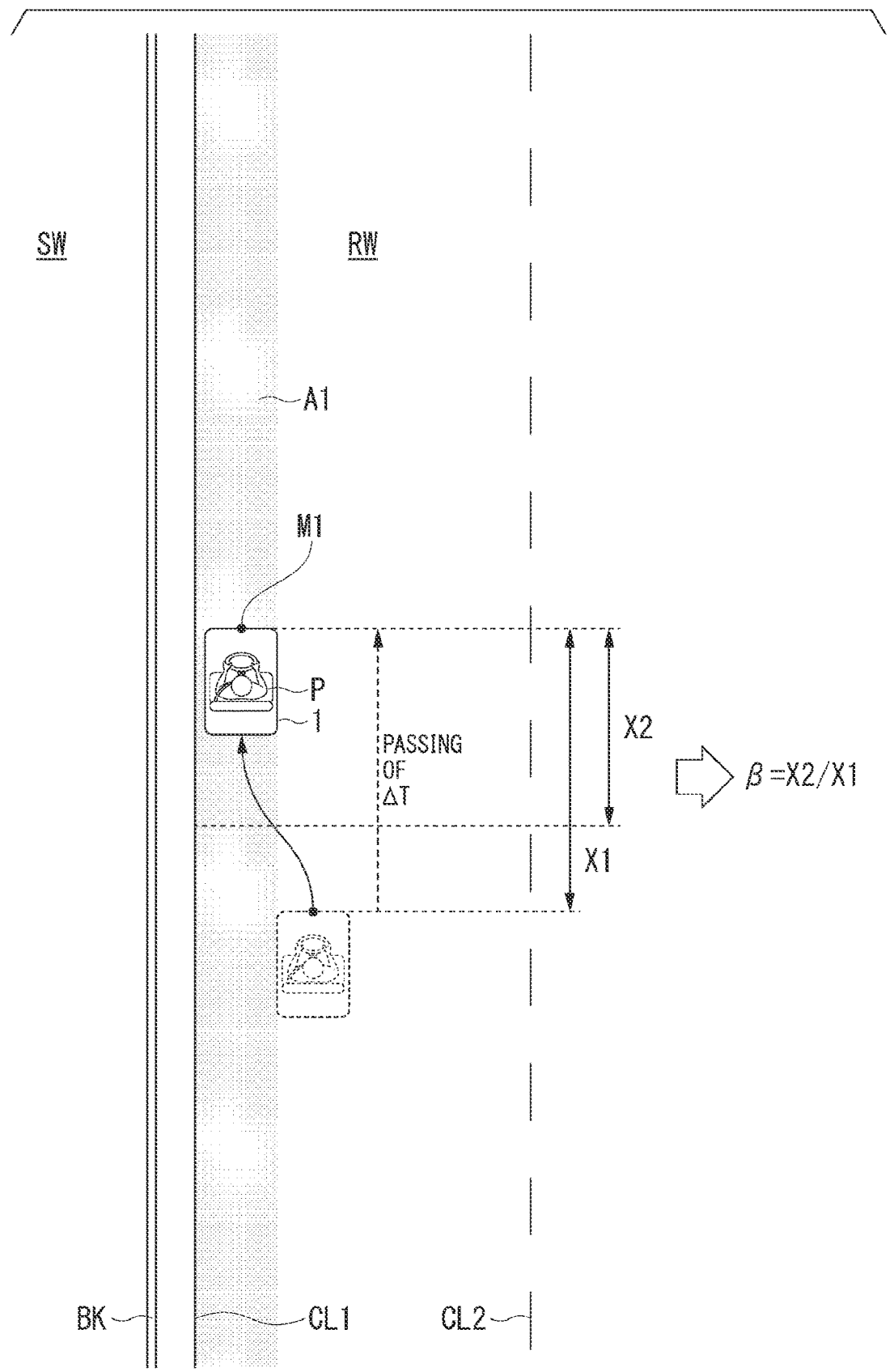
FIG. 7 is a diagram illustrating condition (B).

The predetermined condition is, for example, a condition that a time or distance ratio $\beta$ of movement in a reference region approximate to a sidewalk on a roadway for the reference period $\Delta T$ is equal to or greater than a second threshold Th. FIG. 7 is a diagram illustrating condition (B). In the drawing, A1 is a reference region. In the example of the drawing, the ratio $\beta$ is calculated as a distance ratio. When the mobile object 1 moves in such a region, there is a high possibility of a more detailed behavior such as vibration occurring in the mobile object 1 due to unevenness of an edge of a road shoulder. Therefore, it is considered that the occupant P is highly likely to feel an intention to enter a sidewalk and continuously move.

Condition (C)

The predetermined condition includes, for example, a condition that the number of times an acceleration in the road length direction is reversed for the reference period $\Delta T$ (that is, the number of times a speed is accelerated or decelerated) is equal to or greater than a third threshold Th3. When this condition is satisfied, a traffic situation of a roadway is congested and smooth movement may be difficult. Alternatively, since the occupant P may be fatigue, accuracy of a steering manipulation is estimated to deteriorate. Therefore, it is considered that the occupant P is highly likely to feel an intention to enter a sidewalk and continuously move.

Condition (D)

The predetermined condition includes, for example, a condition that the number of times that a yaw rate equal to or greater than a reference value occurs is equal to or greater than a fourth threshold Th4 for the reference period. When this condition is satisfied, sudden turning occurs several times in a short time. Therefore, a traffic situation of a roadway is congested and smooth movement may be difficult. Alternatively, since the occupant P may be fatigue, accuracy of a steering manipulation is estimated to deteriorate. Therefore, it is considered that the occupant P is highly likely to feel an intention to enter a sidewalk and continuously move.

Figure 8:
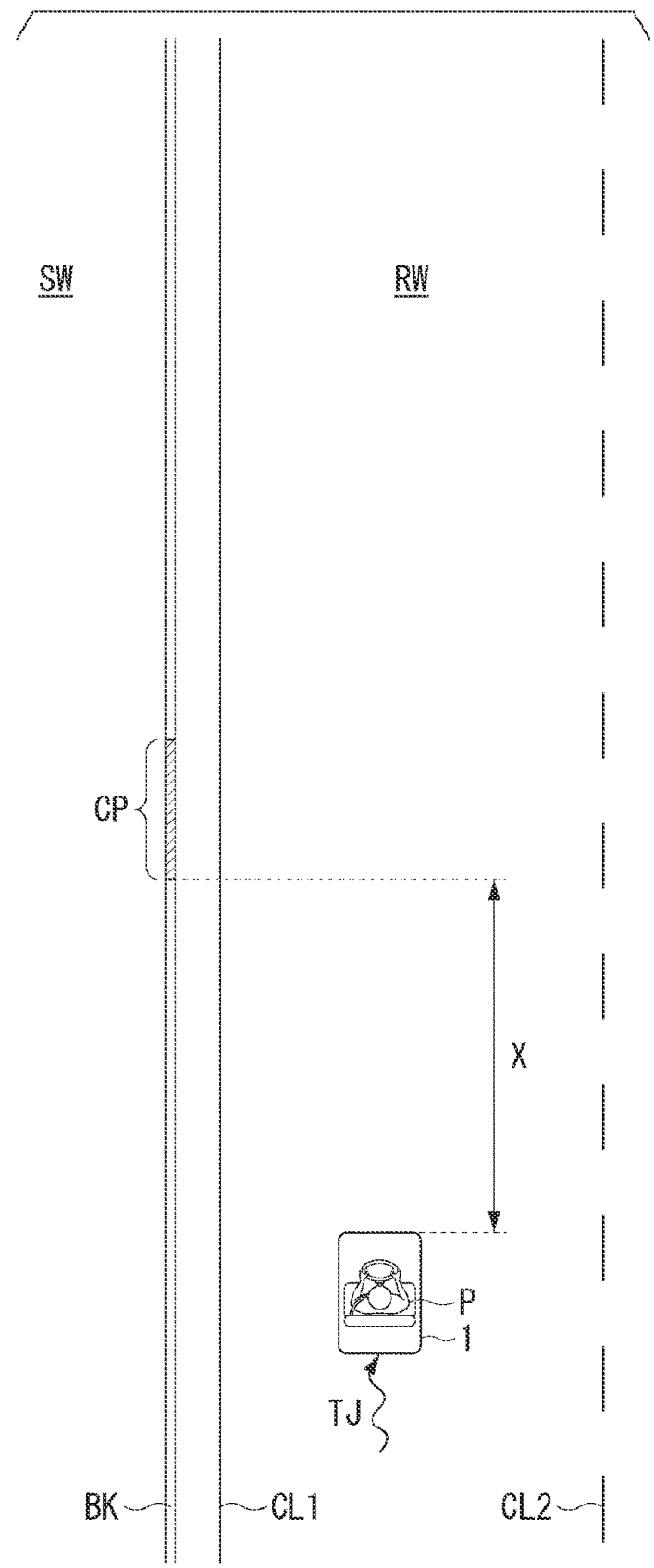
FIG. 8 is a diagram illustrating an example of a scenario in which a specific speed is controlled.

FIG. 8 is a diagram illustrating an example of a scenario in which a specific speed is controlled. In the drawing, X denotes a distance between the mobile object 1 and the contact portion CP. The distance X is defined as, for example, a distance between a position of a frontmost side of the contact portion CP and a front end of the mobile object 1. However, the present invention is not limited thereto and any distance such as a distance between the middle of the contact portion CP and the center of the mobile object 1 may be defined. Specific speed control is performed when the distance X is equal to or less than a predetermined distance (for example, the contact portion CP is within a predetermined range from the mobile object 1) and a behavior of the mobile object 1 satisfies the predetermined condition. In the drawing, TJ is a previous trajectory of the mobile object 1 and indicates an unsteady behavior.

In mode B, the controller 140 gradually switches the upper limit of the speed of the mobile object 1 from the first speed V1 to the second speed V2 when the mobile object 1 is moving on a roadway, the contact portion is recognized within a predetermined range from the mobile object 1, and a behavior of the mobile object 1 satisfies the predetermined condition (a further question may be performed for checking). Instead of this, when the foregoing conditions are satisfied in mode B, the controller 140 may make a suggestion using the conversation device 20 so that the speed is brought closer to the second speed V2 through a manual manipulation simply using the accelerator pedal AP or the brake pedal BP. For example, the controller 140 causes the conversation device 20 to output a vocal sound "Please reduce speed if you enter sidewalk." The definition of the predetermined state is similar to that of mode A.

Figure 9:
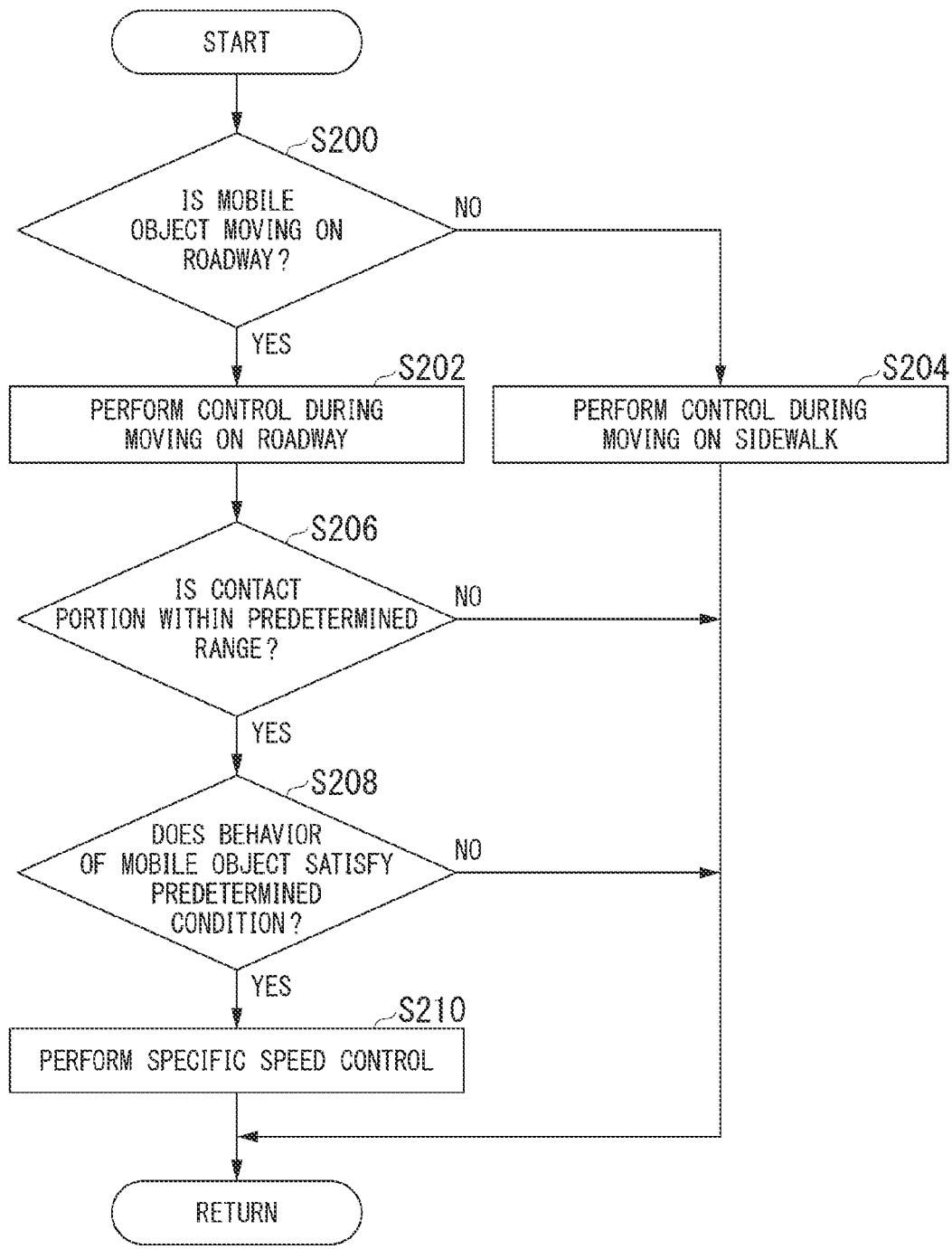
FIG. 9 is a flowchart illustrating an example of a flow of a process performed by the control device according to the embodiment.

FIG. 9 is a flowchart illustrating an example of a flow of a process performed by the control device 100 according to the embodiment. In the process of the flowchart, mode A is a premise. The process of the flowchart is performed repeatedly, for example, at predetermined time intervals.

First, the road type recognizer 120 determines whether the mobile object 1 is moving on a roadway (or is moving on a sidewalk) (step S200). When it is determined that the mobile object 1 is moving on the roadway, the controller 140 performs control of the case in which the mobile object 1 is moving on the roadway, as described above (step S202). Subsequently, based on a recognition result of the contact portion recognizer 130, the controller 140 determines whether the contact portion CP is within the predetermined range in the traveling direction of the mobile object 1 (step S206). When the controller 140 determines that the contact portion CP is within the predetermined range in the traveling direction of the mobile object 1, the controller 140 determines whether a behavior of the mobile object 1 satisfies the predetermined condition based on information supplied from the acquirer 110 (step S208). When the controller 140 determines that the behavior of the mobile object 1 satisfies the predetermined condition, the controller 140 performs the specific speed control (step S210).

When a negative determination result is obtained in step S206 or S208, the process of one routine of the flowchart ends. When it is determined in step S200 that the mobile object 1 is moving on the sidewalk, the controller 140 performs control of the case in which the mobile object 1 is moving on the sidewalk (step S204).

According to the above-described first embodiment, it is possible to appropriately control a mobile object capable of moving on both a roadway and a sidewalk at the time of entrance to a predetermined region from a roadway. When the behavior of the mobile object 1 satisfies the predetermined condition, as described above, a traffic situation of a roadway is congested and smooth movement may be difficult. Alternatively, since the occupant P may be fatigue, accuracy of a steering manipulation is estimated to deteriorate. Accordingly, when the behavior of the mobile object 1 satisfies the predetermined condition, the occupant manipulates the steering wheel WH in the approaching contact portion CP and a probability of the mobile object 1 entering a sidewalk is estimated to increase. Incidentally, there is a difference between the first speed V1 which is the speed of the upper limit or a target speed on a roadway and the second speed V2 which is the upper limit of the speed or a target speed on a sidewalk. Therefore, when the mobile object 1 moving at the first speed V1 abruptly enters a sidewalk, a scenario in which sudden deceleration has to be performed can occur. When turning to enter a sidewalk is started during movement at the first speed V1 which is a relatively high speed, there is concern of a large lateral acceleration occurring. That is, there is a possibility of deceleration being late after steering actually starts.

On the other hand, the control device 100 according to the embodiment can inhibit the foregoing sudden deceleration or sudden turning from occurring because of bringing of a speed of the mobile object closer to the second speed V2 when the mobile object 1 is moving on a roadway, the contact portion CP is recognized within the predetermined range in the traveling direction of the mobile object 1, and the behavior of the mobile object 1 satisfies the predetermined condition. As a result, it is possible to perform appropriate control at the time of entrance from a roadway to a sidewalk.

Second Embodiment

Hereinafter, a second embodiment will be described. The control device 100 of the second embodiment is different from that of the first embodiment in the function of the road type recognizer 120. The road type recognizer 120 according to the second embodiment recognizes whether the mobile object 1 is traveling on a roadway or a sidewalk, for example, in response to a manipulation of an occupant on a road type input switch (not illustrated) provided in the mobile object. The road type input switch is provided in, for example, a boss section or the like of the steering wheel WH. The road type input switch includes, for example, a mechanism which can be manipulated to upper and lower sides and maintain a manipulated position, indicates a roadway when the road type input switch is manipulated to the upper side, and indicates a sidewalk when the road type input switch is manipulated to the lower side. The road type input switch may be of a button or GUI switch type. When the road type input switch is manipulated in a state in which the control device 100 recognizes that the mobile object is traveling on a sidewalk, the recognition may be switched to recognition during traveling on a sidewalk. When the road type input switch is manipulated in a state in which the control device 100 is traveling on a roadway, the recognition may be switched to recognition during traveling on a roadway. In this configuration, since the function of automatically recognizing whether the mobile object 1 is traveling on a roadway or a sidewalk can be omitted, it is possible to reduce a processing load or cost. Here, since there is a possibility of an erroneous manipulation by an occupant, the external report device 50 preferably reports information to the outside in the second embodiment.

Others

In the foregoing embodiments, the controller 140 may perform the control of only one of mode A and mode B. That is, the mobile object 1 may perform the speed assistance mode and may not perform the manual mode, or may perform the manual mode and may not perform the speed assistance mode. The controller 140 may perform the control of both mode A and mode B, but may perform the specific speed control only when one of mode A and mode B is performed. In any case, whether to perform the control of mode C may be arbitrarily determined.

The embodiments for carrying out the present invention have been described above, but the present invention is not limited to the embodiments. Various modifications and substitutions can be made within the scope of the present invention without departing from the gist of the present invention.

What is claimed is:

1. A mobile object control device comprising:
a storage device storing a program; and
a hardware processor,
wherein the hardware processor executes the program stored in the storage device to:
acquire information indicating a behavior of a mobile object which is capable of moving on both a roadway and a sidewalk different from the roadway;
recognize whether the mobile object is moving on the roadway or the sidewalk;
recognize presence of a contact portion between the sidewalk and the roadway in a traveling direction of the mobile object, the contact portion being provided at a boundary between the sidewalk and the roadway and being a portion in which a load is less than in other portions of the boundary when the mobile object passes through;
control the speed of the mobile object at least partially;
limit a speed at which the mobile object is moving on the roadway to a first speed;
limit a speed at which the mobile object is moving on the sidewalk to a second speed slower than the first speed; and
bring a speed of the mobile object closer to the second speed when the mobile object is moving on the roadway, the contact portion is recognized within a predetermined range from the mobile object, and a behavior of the mobile object satisfies a predetermined condition,
wherein the predetermined condition is a condition for determining whether the mobile object is in an unsteady state.

2. The mobile object control device according to claim 1, wherein the hardware processor questions about an intention to enter the sidewalk using an interface device when the mobile object is moving on the roadway, the contact portion is recognized within a predetermined range from the mobile object, and the behavior of the mobile object satisfies the predetermined condition, and a speed of the mobile object is brought closer to the second speed when a positive response is obtained.

3. The mobile object control device according to claim 1, wherein the hardware processor acquires a movement amount, a speed, or an acceleration of the mobile object in a road width direction as information indicating a behavior of the mobile object, and
wherein the predetermined condition includes a condition that the number of times the movement amount, the speed, or a direction of the acceleration in the road width direction is reversed for a predetermined period is equal to or greater than a first threshold.

4. The mobile object control device according to claim 1, wherein the hardware processor acquires a position of the mobile object in the road width direction as information indicating a behavior of the mobile object, and
wherein the predetermined condition includes a condition that a time or distance ratio of movement in a reference region approximate to the sidewalk on the roadway for a predetermined period is equal to or greater than a second threshold.

5. The mobile object control device according to claim 1, wherein the hardware processor acquires an acceleration of the mobile object in a road length direction as information indicating a behavior of the mobile object, and
wherein the predetermined condition includes a condition that the number of times the acceleration in the road length direction is reversed for a predetermined period is equal to or greater than a third threshold.

6. The mobile object control device according to claim 1, wherein the hardware processor acquires a yaw rate of the mobile object as information indicating a behavior of the mobile object, and
wherein the predetermined condition includes a condition that the number of times the yaw rate equal to or greater than a reference value occurs for a predetermined period is equal to or greater than a fourth threshold.

7. The mobile object control device according to claim 1, wherein the hardware processor recognizes whether the mobile object is moving on the roadway or the sidewalk based on an output of an outside world detection device detecting an outside situation of the mobile object.

8. The mobile object control device according to claim 1, wherein the hardware processor recognizes whether the mobile object is moving on the roadway or the sidewalk based on a manipulation of an occupant of the mobile object on a switch provided inside the mobile object.

9. The mobile object control device according to claim 1, wherein, when the hardware processor recognizes that the mobile object is moving on the sidewalk, the hardware processor causes an external report device to report the mobile object which is moving on the sidewalk to the outside of the mobile object.

10. A mobile object control method using a computer controlling a mobile object which is capable of moving both on a roadway and a sidewalk different from the roadway, the method comprising:
acquiring information indicating a behavior of the mobile object;
recognizing whether the mobile object is moving on the roadway or the sidewalk;
recognizing presence of a contact portion between the sidewalk and the roadway in a traveling direction of the mobile object, the contact portion being provided at a boundary between the sidewalk and the roadway and being a portion in which a load is less than in other portions of the boundary when the mobile object passes through;

controlling the speed of the mobile object at least partially;

limiting a speed at which the mobile object is moving on the roadway to a first speed;

limiting a speed at which the mobile object is moving on the sidewalk to a second speed slower than the first speed; and bringing a speed of the mobile object closer to the second speed when the mobile object is moving on the roadway, the contact portion is recognized within a predetermined range from the mobile object, and a behavior of the mobile object satisfies a predetermined condition, wherein the predetermined condition is a condition for determining whether the mobile object is in an unsteady state.

11. A mobile object control device comprising:

a storage device storing a program; and a hardware processor, wherein the hardware processor executes the program stored in the storage device to:

acquire information indicating a behavior of a mobile object on which at least one occupant gets and which is capable of moving on both a roadway and a sidewalk different from the roadway;

recognize whether the mobile object is moving on the roadway or the sidewalk;

recognize presence of a contact portion between the sidewalk and the roadway in a traveling direction of the mobile object, the contact portion being provided at a boundary between the sidewalk and the roadway and being a portion in which a load is less than in other portions of the boundary when the mobile object passes through;

control the speed of the mobile object at least partially;

limit a speed at which the mobile object is moving on the roadway to a first speed;

limit a speed at which the mobile object is moving on the sidewalk to a second speed slower than the first speed; and suggest deceleration to the occupant using an interface device when the mobile object is moving on the roadway, the contact portion is recognized within a predetermined range from the mobile object, and the behavior of the mobile object satisfies a predetermined condition, wherein the predetermined condition is a condition for determining whether the mobile object is in an unsteady state.

12. A mobile object control method using a computer controlling a mobile object on which at least one occupant gets and which is capable of moving both on a roadway and a sidewalk different from the roadway, the method comprising:

acquiring information indicating a behavior of a mobile object;

recognizing whether the mobile object is moving on the roadway or the sidewalk;

recognizing presence of a contact portion between the sidewalk and the roadway in a traveling direction of the mobile object, the contact portion being provided at a boundary between the sidewalk and the roadway and being a portion in which a load is less than in other portions of the boundary when the mobile object passes through;

controlling the speed of the mobile object at least partially;

limiting a speed at which the mobile object is moving on the roadway to a first speed;

limiting a speed at which the mobile object is moving on the sidewalk to a second speed slower than the first speed; and suggesting deceleration to the occupant using an interface device when the mobile object is moving on the roadway, the contact portion is recognized within a predetermined range from the mobile object, and the behavior of the mobile object satisfies a predetermined condition, wherein the predetermined condition is a condition for determining whether the mobile object is in an unsteady state.

* * * * *